July 12, 1966  S. A. WRIGHT ETAL  3,260,780
PROCESS FOR SHAPING THERMOPLASTIC SHEET
Filed Oct. 2, 1962
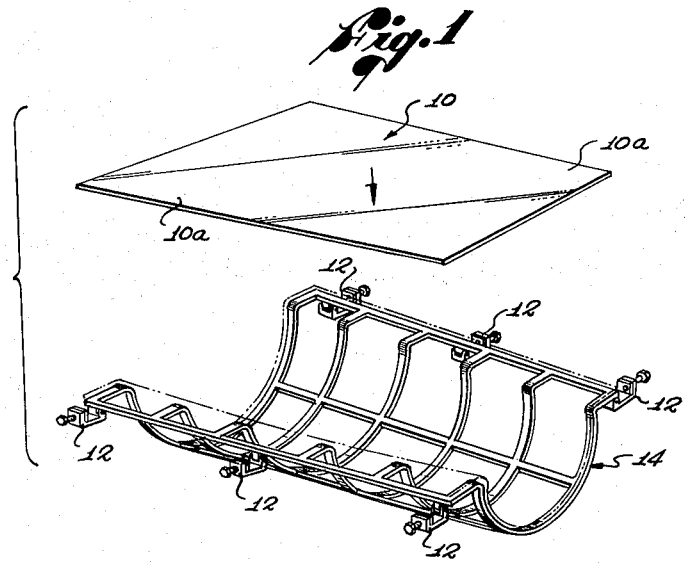
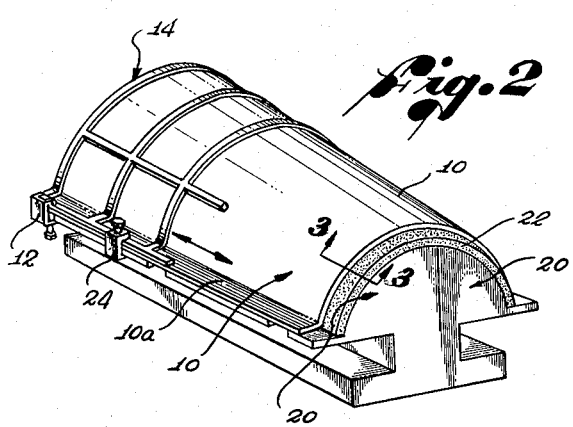
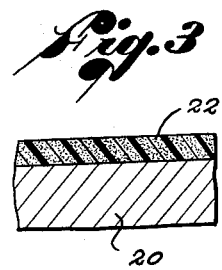
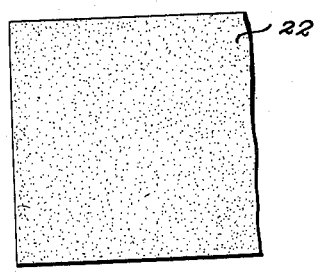
INVENTORS
STANLEY A. WRIGHT
TERRY D. FORTIN
BY
Fulwider, Patton, Rieber,
Lee, and Utecht
ATTORNEYS

3,260,780
PROCESS FOR SHAPING THERMOPLASTIC SHEET
Stanley A. Wright, Saugus, and Terry D. Fortin, Reseda, Calif., assignors to Fortin Plastics, Inc., Saugus, Calif., a corporation of California
Filed Oct. 2, 1962, Ser. No. 227,833
6 Claims. (Cl. 264—313)

This invention relates generally to the shaping of thermoplastic sheet material, and relates especially to the forming of transparent thermoplastic sheet, such as polymethyl methacrylate sheet, into shapes having simple or compound curvatures with a minimum of optical distortion.

Prior art processes for the shaping of transparent thermoplastic sheet into simple and/or compound curvature for use as aircraft canopies or the like have several disadvantages. In order to better understand the nature of these drawbacks, the typical prior art process will be briefly described.

The transparent thermoplastic sheet is heated to a point well above its heat distortion point, and to a temperature at which it becomes pliable. It is next clamped onto a die having the desired curvature while in the heated condition. The pliable part is moved back and forth with respect to the die in order to minimize die mark-off onto the plastic surface. A liquid lubricant, e.g., grease or oil, may first be used to coat the die surface in order to reduce friction during movement. In so-called grease forming, the die must be heated and the forming process becomes quite lengthy.

In order to further reduce mark-off from the die surface, the die surface is covered with flannel or rubberized suede. Fine hair-line type scratches nevertheless are produced in the sheet during forming, these scratches being caused by the die surface covering. Furthermore, grease marks may mar the finish of the sheet where any slight excess of lubricant is used, or where channelling of the grease occurs. The forming process must be performed in a dust-free atmosphere; otherwise, the dust will be picked up by the part being formed, and the result is tiny imperfections in the surface of the part.

Bearing in mind the foregoing, it is a major object of the present invention to provide a method for the shaping of thermoplastic sheet wherein die mark-off is completely avoided, and the optical properties of the sheet remain substantially unaltered.

It is another object of the present invention to provide a method for the shaping of transparent thermoplastic sheet wherein the processing time can be appreciably shortened.

It is still a further object of the present invention to provide a method for the shaping of transparent thermoplastic sheet, such as polymethyl methacrylate, wherein die mark-off is completely avoided, and which process need not be conducted in a substantially dust-free atmosphere, as in the prior art.

These and other objects of the present invention will become more clearly understood by referring to the following description, and to the accompanying drawings wherein:

FIGURE 1 is a side elevational cross-section of an early step of our proces, the preshaping of the transparent thermoplastic sheet;

FIGURE 2 is a perspective schematic showing of apparatus for final shaping of the transparent sheet;

FIGURE 3 is a view in cross-section, along line 3—3 of FIGURE 2; and

FIGURE 4 is a plan view of FIGURE 3, showing the surface covering for the die member.

In general, our process for shaping transparent thermoplastic sheet comprises the steps of heating the sheet to a temperature at which it can be shaped, i.e., to a temperature above the heat distortion temperature and sufficiently above that temperature so that it becomes pliable. Next, the sheet, so heated, is clamped onto a rigid shape that roughly approximates the surface of the die. This rigid shape is termed a "hold-down" in the art. Next, the preshaped sheet, together with the "hold-down," is clamped onto a male die member of the finally desired configuration. This male die member is covered with a layer of material having the following characteristics: (1) non-fibrous, (2) fine celled (preferably of an interconnected or open cellular structure), (3) resilient, (4) having a thermal conductivity (K factor) less than that of the thermoplastic sheet, and (5) having a softening or melting point above the forming temperature of the thermoplastic sheet to be formed.

The preheated and preformed sheet is clamped to the male die member in a way such that the die member is moved back and forth with respect to the heated sheet a short distance. In order to facilitate such movement, a lubricant, solid at room temperature, is first uniformly interspersed into the open-celled die surface cover the lubricant usually, but not always having a melting point below the distortion temperature of the plastic sheet.

The nature of the die surface cover, in combination with the initially solid lubricant, enables the sheet to be moved back and forth (while cooling) with a minimum of friction and without mark-off from the die. The resilience of the die cover appears to, in effect, prevent transfer of any minor defects in the die to the part itself. For example, any high spots in the die are effectively smoothed out by means of the resilient cover. Additionally, the relatively low thermal conductivity of the resilient cover, in combination with the relative movement of thermoplastic sheet-to-die, is believed to be responsible for the absence of mark-off of the cellular pattern of the cover onto the surface of the sheet. Thermal conductivities of the materials employed lie in the range of 0.2 to 0.3 B.t.u. inch/ft.$^2$ ° F. hr., below that of polymethyl methacrylate and of most other thermoplastics.

No heating takes place during the forming step of our invention, the sheet being allowed to cool at its own rate in a room temperature environment. The forming process is thus much more rapid than hitherto practiced in the prior art where heating of the die is required.

Upon cooling of the part to below the heat distortion point of the particular sheet being processed, the formed sheet is released from the die. The sheet is then cleaned and trimmed to the desired size.

Referring now to the drawings, the process of this invention will now be described with reference to the production of an aircraft canopy.

A flat cast thermoplastic sheet 10, such as polymethyl methacrylate (e.g., Plexiglas 55, manufactured by Rohm & Haas) is heated in an oven (not shown) to a temperature above the heat distortion temperature of the sheet. For example, in the case of acrylic sheet, the heat distortion temperature ranges between 140° and 220° F. The preferred temperature for forming is that temperature at which the material becomes pliable, and usually lies substantially above the heat distortion point of the particular thermoplastic. The forming tempertaure generally ranges between 250° and 400° F. for acrylic materials. For polymethyl methacrylate (Plexiglas 55), the preferred forming temperature lies between 300° and 375° F.

The sheet 10, upon being heated to the requisite forming temperature, is taken from the oven and clamped at its longitudinal edges 10a in a female forming member or "hold-down" 14 by means of clamps 12 (see FIGURE 1). The concavity of the "hold-down" roughly approximates the final desired shape of the aircraft canopy.

The heated pliable sheet 10 quickly sags from its initial planar shape and assumes the shape of the concavity of the "hold-down" 14.

The hot pliable sheet 10, together with the "hold-down" 14, is then inverted and clamped by its edges 10a onto the male die member 20 by clamps 24. (See FIGURE 2). The entire time elapsed, from withdrawal of the sheet 10 from the oven until its clamping onto the die member 20, is about one minute. The temperature drop is generally on the order of 20° to 50° F.

The die member 20 is covered with a layer of resilient, non-fibrous, interconnected or open fine-celled insulative material 22, such as polyester polyurethane foam of 1 to 3#/sq. ft. density, or silicone rubber foam. The foams chosen have a maximum operating temperature above the minimum forming temperature of the thermoplastic employed. Generally speaking, urethane foams are reaction products of polyisocyanates (e.g., toluene diisocyanate) and hydroxyl rich material (e.g., polyether glycols or adipic acid polyesters). Silicone rubbers are reaction products of dimethyldichlorosilane with diphenyldichlorosilane.

The foam layer may range between ⅛" and ½" in thickness. Greater thickness may be used, but without any substantially increased benefits. About a ¼" material thickness is preferred.

The die member 20 is not heated, and the sheet 10 therefore cools rapidly. Throughout the cooling of the sheet 10, it is maintained in contiguous abutment with the die member 20 and the cover 22 thereof by means of edge clamps 24, so that the desired curvature may be obtained. The clamps 24 are thus generally required to be tightened from time to time to maintain the sheet 10 in desired position. Mechanical reciprocating means, conventional in the art and not shown here, are employed to reciprocally move the die member 20 (and its cover 22) back and forth over a length of ½" to 1" with respect to the sheet 10. In this connection, clamps 24, clamping the die 20 to the "hold-down" 14, are provided with appropriate spring loading means permitting relative longitudinal movement between die member 20 and sheet 10.

As mentioned previously, the resiliency of the cover layer 22 provides a means for smoothing out any inaccuracies in the die. Furthermore, the insulative qualities of the covering 22, in combination with continuous reciprocal movement of the sheet 10 with respect to the die member 22, appears to positively prevent mark-off of the fine cellular pattern of the covering 22 (approximately 10,000 cells per square inch) onto the sheet 10.

To facilitate the reciprocal movement and avoid marking due to friction, a solid lubricant in powder form (—300 mesh or smaller) is first interspersed into the fine open-cellular cover 22. The solid lubricant usually, but not always, has a melting point below the heat distortion temperature of the sheet 10. Thus, as the sheet 10 cools from its initial forming temperature, the lubricant usually remains liquid until the sheet cools below its heat distortion temperature. Mark-off does not occur at a temperature below the heat distortion point because of the rigidity of the surface at that point. Very small amounts of lubricant are required, being of the order of 1–5 gms. per square foot of sheet surface. Channeling of the lubricant is effectively avoided by this just-described means. An example of lubricant employed is zinc stearate (M.P. 122° F.).

The reciprocal movement of the sheet 10 with relation to the die 20 continues until the sheet is cooled below its heat distortion point. The sheet can then be released from the die member 20. The lubricant leaves a film on the surface of the sheet 10, and this can be readily removed by a mild solvent. The sheet is then trimmed to size and is ready for use.

A specific example of the formation of an aircraft canopy is set out below:

Sheet 10 of Plexiglas 55 of appropriate size and ½" in thickness is heated to 375° F. in an oven, and transferred to the "hold-down" 14 and clamped therein. The "hold-down" 14 and sheet 10 are then inverted and clamped onto the male die member 20 having 2# per square foot, ¼" thick polyester urethane foam covering 22. Spring-loaded clamps 24 are employed to clamp the "hold-down" 14 and sheet 10 to the compound-curvatured die 20 while allowing relative longitudinal reciprocal movement, as indicated by the arrows in FIGURE 2.

The foam covering 22 (Nopco-foam®) has a fine open cell structure and has sprinkled therein 2 ounces per 25 square feet of zinc stearate.

After the sheet 10 has been clamped in place with respect to die 20, its surface temperature has decreased to 350° F. By conventional means, the die member 20 is moved reciprocally back and forth with respect to sheet 10 and "hold-down" 14 for a distance of approximately ¾". The zinc stearate acts as a lubricant.

Since the die member 20 is not heated, the sheet 10 cools in about 20 minutes below its heat distortion temperature. The formed sheet 10 is preferably removed from the die and "hold-down" when it has decreased in temperature to between 120° and 180° F.

The zinc stearate leaves a waxy film on the sheet surface. This is readily removed by denatured alcohol. The part is then trimmed to size and is ready for use.

The optical properties of the sheet remain substantially unaltered and mark-off is absent for reasons discussed previously.

Attention is drawn to the fact that the forming operation need not be conducted in a dust-free atmosphere since the porous nature of the surface cover appears to entrap the dust and to prevent it from marring the surface finish of the sheet. Also, the forming operation is relatively rapid compared to that of the prior art because the male die member is not heated at all. Furthermore, the type of surface covering employed, in combination with the solid lubricant and reciprocal movement of the sheet relative to the die, effectively prevents any surface cover mark-off onto the surface of the thermoplastic sheet.

While a specific embodiment of our invention has been described, it will be understood that changes and modifications therein can be made that lie within the skill of the art, and within the scope of our invention. Thus, while particular reference has been made to acrylic plastics, our process is applicable to all thermoplastics. Therefore, we intend to be bound only by the scope of the claims which follow.

We claim:

1. A process for shaping thermoplastic sheet, which comprises:
   facing the working surface of a die member having a desired curvature with a non-fibrous, fine cellular, resilient layer of insulative material;
   adding a lubricant material to said resilient layer of insulative material;
   heating said sheet to a temperature above its heat distortion point;
   placing said heated sheet directly onto said resilient layer of insulative material;
   simultaneously cooling said heated sheet while reciprocally moving said sheet with respect to said die member and resilient layer mounted thereon; and
   removing said sheet from said die member after it has cooled below its heat distortion point.

2. The process of claim 1 wherein said thermoplastic sheet is polymethyl methacrylate and said sheet is first heated to a temperature of between about 250° F. to 400° F.

3. The process of claim 1 wherein said resilient layer of insulative material has a thermal conductivity less than that of said thermoplastic sheet.

4. The process of claim 1 wherein said lubricant is solid at room temperature and has a melting point below the heat distortion point of said sheet to be formed.

5. The process of claim 1 wherein said lubricant is zinc stearate.

6. The process of claim 1 wherein said resilient layer is a polyurethane foam.

References Cited by the Examiner

UNITED STATES PATENTS

| | | |
|---|---|---|
| 2,332,926 | 10/1943 | May et al. |
| 2,444,123 | 6/1948 | Walsh. |
| 2,478,165 | 8/1949 | Collins. |
| 2,486,817 | 11/1949 | Berger et al. |
| 2,861,297 | 11/1958 | Guerreiro. |
| 3,041,668 | 7/1962 | Bonza et al. |

OTHER REFERENCES

Plexiglas Fabricating Manual, 9th edition, Rohm & Haas Co., Washington Square, Philadelphia 5, Pa., Feb. 15, 1945.

ROBERT F. WHITE, *Primary Examiner.*

ALEXANDER H. BRODMERKEL, *Examiner.*

M. R. DOWLING, *Assistant Examiner.*